United States Patent [19]

Sugawara et al.

[11] Patent Number: 5,527,581
[45] Date of Patent: Jun. 18, 1996

[54] CAR INTERIOR MEMBER AND MOLDING METHOD OF THE SAME

[75] Inventors: Minoru Sugawara; Koki Hirano; Katsuhiko Tada; Tetsuya Nakamura, all of Ichihara, Japan

[73] Assignee: Idemitsu Petrochemical Co., Ltd., Tokyo, Japan

[21] Appl. No.: 307,935

[22] Filed: Sep. 16, 1994

[30] Foreign Application Priority Data

Sep. 17, 1993 [JP] Japan .................................. 5-231456

[51] Int. Cl.⁶ ...................................................... B32B 9/00
[52] U.S. Cl. ...................... 428/71; 428/35.7; 428/120; 428/124; 428/126; 428/159; 428/161; 428/192; 428/217; 428/304.4; 428/309.9; 264/46.5; 264/134; 264/240; 264/257
[58] Field of Search ..................... 428/71, 161, 159, 428/304.4, 309.9, 120, 35.7, 124, 126, 192, 217; 264/46.5, 134, 240, 45.2, 328.6, 257

[56] References Cited

U.S. PATENT DOCUMENTS 4,952,358 8/1990 Okina et al. .......................... 264/134
5,071,605 12/1991 Kawaguchi et al. ................. 264/45.2
5,180,617 1/1993 Takeuchi et al. ........................ 428/71
5,188,882 2/1993 Uchiyama et al. ..................... 428/159
5,318,822 6/1994 Rhodes ................................. 428/120

FOREIGN PATENT DOCUMENTS 0175121 3/1986 European Pat. Off. .
0274535 7/1988 European Pat. Off. .
0492532A3 7/1992 European Pat. Off. .

Primary Examiner—Patrick J. Ryan
Assistant Examiner—Abraham Bahta
Attorney, Agent, or Firm—Flynn, Thiel, Boutell & Tanis

[57] ABSTRACT

The car interior member and its molding method are offered to improve recycling and to reduce the number of parts. The instrument panel 10 as the car interior member is made by molding integrally the core member 11 organizing the main structure of certain area of car interior and the functional member 12, 13, 14 having particular function and attached to the core member 11 by the blow molding. On the occasion of then, the number of parts can be more reduced when the base layer arranging the most inside and the foamed layer and the surface layer arranging outside of the base layer are effected by the multilayer blow molding in case of the instrument panel 10 formed with the multi-layer construction.

20 Claims, 5 Drawing Sheets

CAR INTERIOR MEMBER AND MOLDING METHOD OF THE SAME

BACKGROUND OF THE INVENTION

1. Field of the Invention

This invention relates to a car interior member and its molding method, and intends particularly to be used to mold an instrument panel in front area of the car, a rear-board unit in rear area of the car, a door trim, a console unit, a head rest, a trunk-room unit and various lids.

2. Description of the Related Art

Conventionally, the car interior members such as the instrument panel have been advancing in resinification to comply with requirements of moldability, free in shape, design, corrosion resistance and weight saving, and more particularly, a polyolefin resin material such as polypropylene has been employed to satisfy requirement of high-temperature properties and stiffness properties for the car interior member.

The car interior member, especially the instrument panel, is provided with a lot of functional parts held some functions such as ducts and meter clusters, and its shape is rather complicated.

Accordingly, under the present circumstances, a core member and every functional member defining the car interior member are separately formed, and then the car interior member can be assembled with the separately prepared parts.

The above polyolefin resin material such as polypropylene used in many cases as the car interior member is not applicable in a large-scale blow molding because of a dissatisfactory blow moldability such as drawdown resistance. Therefore, an external appearance of a molding tends to be inferior even if the drawdown resistance is improved by an increase of molecular weight. Accordingly, the blow molding has been applied limitedly to members not exposing from surface of the car interior, which does not require a satisfaction on an external appearance, and comparatively small functional member.

Figure 8:
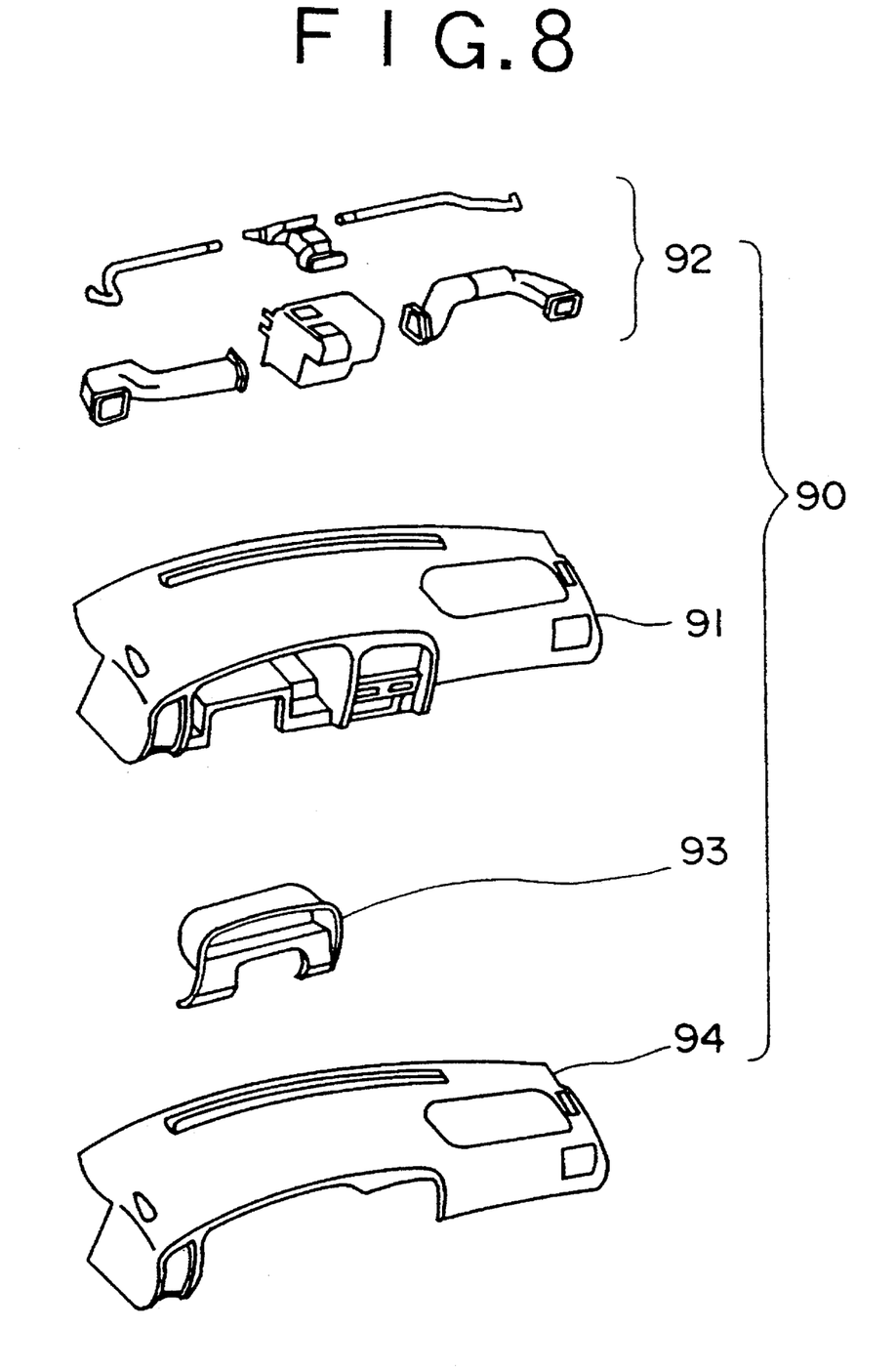
FIG. 8 is a perspective view of an entire appearance of a conventional embodiment.

FIG. 8 depicts a molding method for an instrument panel 90 as an example of conventional molding method for the above described car interior member.

The instrument panel 90 is arranged with a core member 91 forming main structure of the front area of the car interior, a duct 92 as functional member applied in the core member 91, a meter cluster 93 and a surface member 94.

The core member 91 is formed by an injection molding with a denatured substance of PPO (polyphenylene oxide) (Trademark; "NORIRU"), PPF (filler filled polypropylene), or PPG (glassfibre filled polypropylene).

The duct 92 is provided for an air-conditioning, heater, defroster received in the core member 91 and is formed by the blow molding with PP (polypropylene), or PP/EPR (polypropylene/ethylene propylene rubber).

The meter cluster 93 is a member surrounding several meters such as a speed meter and is formed by an injection molding with ABS (acrylonitrile butadiene styrene), a denatured substance of PPO (polyphenylene oxide) (Trademark; "NORIRU"), or PPF (filler filled polypropylene).

The surface member 94 is to be the most outside of the instrument panel 90, and is defined by a surface layer made from PVC (polyvinylchloride) and a foamed layer made from foaming urethane and laminating inside of the surface layer by mean of a slash molding or a thermoforming. The instrument panel 90 is assembled with the members formed individually with respective materials and by different molding methods.

However, in the Conventional molding method for the car interior member like the molding method for the instrument panel 90 depicted in above FIG. 8, number of parts has been increased to form individually the core member composing the main structure in certain area of the car interior and the functional member having particular function attached in the core member.

Therefore, cost that was expensive to need a material, die, molding apparatus for every member and to manage such members was subject matter.

It was subject matter that manufacture took much time because the process of molding for every member and the process of assembling every member are required when the car interior member has been manufactured.

And also, difficult recycling was subject matter because individually formed members have been made from different materials and all members have not been able to be recycled all together.

In case of recycling, a necessity of frequent process and cost for collecting parted members was subject matter.

The present invention has an object to supply the car interior member and its molding method that can reduce number of parts and improve recycling.

SUMMARY OF THE INVENTION

To attain this above object, the present inventions is that the core member and every functional member arranging the car interior member are integrally molded with the blow molding.

In concrete, the car interior member in the present invention is characterized as the core member organizing a main structure in certain area of car interior and the functional member having every function and attached to the core member are integrated and formed by the blow molding method.

The molding method of the car interior member in the present invention is characterized as the core member organizing the main structure in certain area of car interior and the functional member having every function and attached to the core member are integrally molded with the blow molding.

The molding method of the car interior member in the present invention is characterized as the above core member and the above functional member are formed with more than two layers among the base layer placed on the most inside and the surface layer placed on the most outside, and the more than two layers of them, including at least the base layer, are simultaneously molded with the multilayer blow molding.

The molding method of the car interior member in the present invention is characterized as the foamed layer is placed adjacent to outside of the above base layer, and at least the above base layer and the above foamed layer are simultaneously molded with the multilayer blow molding.

The molding method of the car interior member in the present invention is characterized as all layers from the above base layer to the above surface layer are made from the polyolefin resin material.

The molding method of the car interior member in the present invention is characterized as the above certain area is assigned as parts of the instrument panel placed in front area of the car.

The present invention specifies the car interior member to integrally mold the core member organizing the main structure in certain area of car interior and the functional member with every function placing in the core member with the blow molding.

The number of parts is reduced fewer than then because the then each molded core member and every functional member are integrally formed.

The process of assemble is unnecessary or is assigned as easier work because the process of molding is retrenched with reducing number of parts on occasion of producing the car interior member.

More reduction of the number of parts is schemed to unnecessary mold the then surface member 94 (see FIG. 8) as another member, when the core member and every functional member are formed with more than two layers among the base layer placed on the most inside and the surface layer placed on the most outside, and at least over two layers of them, including the base layer, are simultaneously molded.

It is possible to scheme the reduction of the number of parts just as sound insulation, the sense of luxury on tapping, damping and others are bestowed the car interior member by the foamed layer, when the foamed layer is placed adjacent to the outside of the base layer and the multilayer blow molding is effected to the foamed layer.

All layers from the base layer to the surface layer formed by the polyolefin resin material are possible the recycling in a lump and the easier recycling work.

When the present invention is applied to the part of instrument panel which particularly holds a lot of number of parts, effectiveness of the present invention gains conspicuously and then the above objectives are attained.

DETAILED DESCRIPTION OF THE PREFERRED EMBODIMENT(S)

The preferred embodiment of the present invention will now be described with reference to the drawings.

Figure 1:
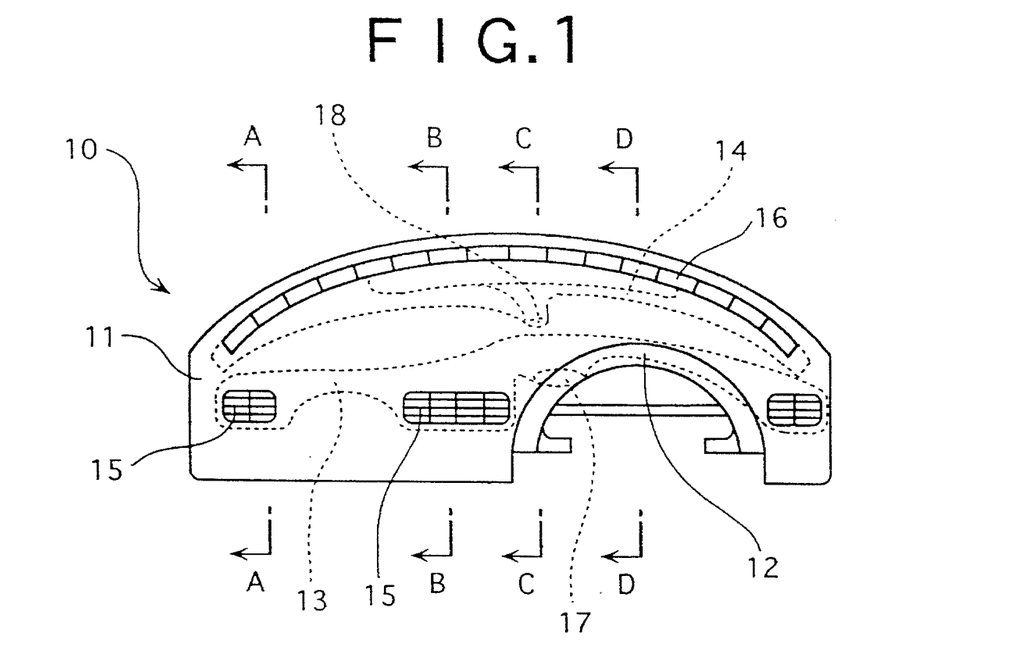
FIG. 1 is a front view of appearance of the first embodiment for the present invention.
Figure 2:
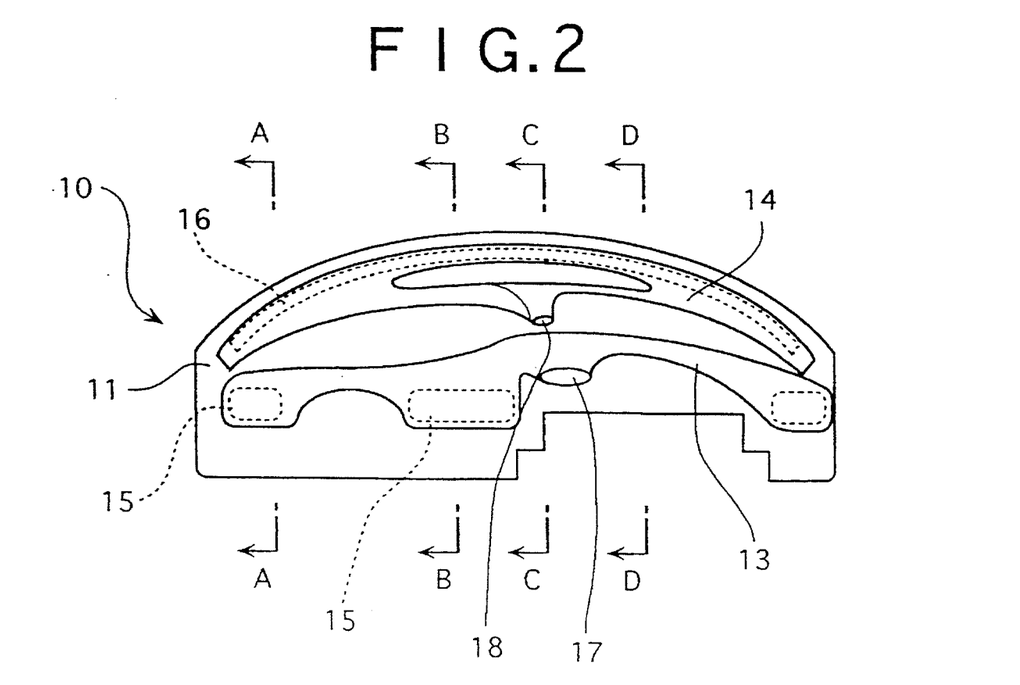
FIG. 2 is a back view of the above embodiment.
Figure 3:
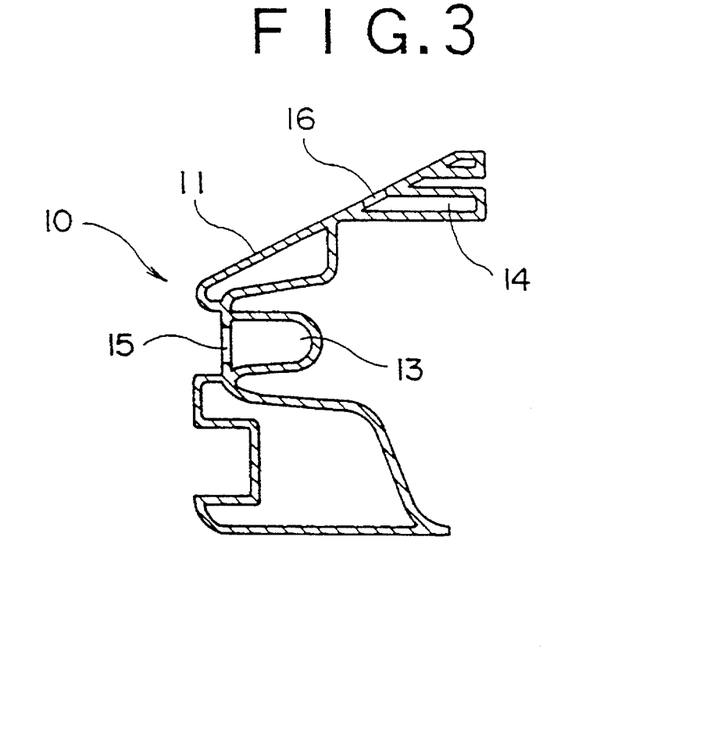
FIG. 3 is a sectional view of the point A in FIGS. 1, 2 of the above embodiment.
Figure 4:
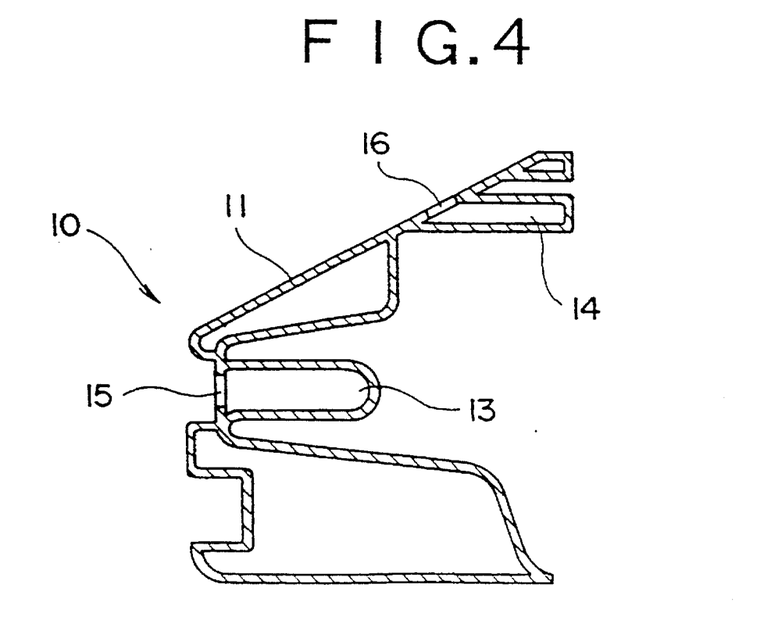
FIG. 4 is a sectional view of the point B in FIGS. 1, 2 of the above embodiment.
Figure 5:
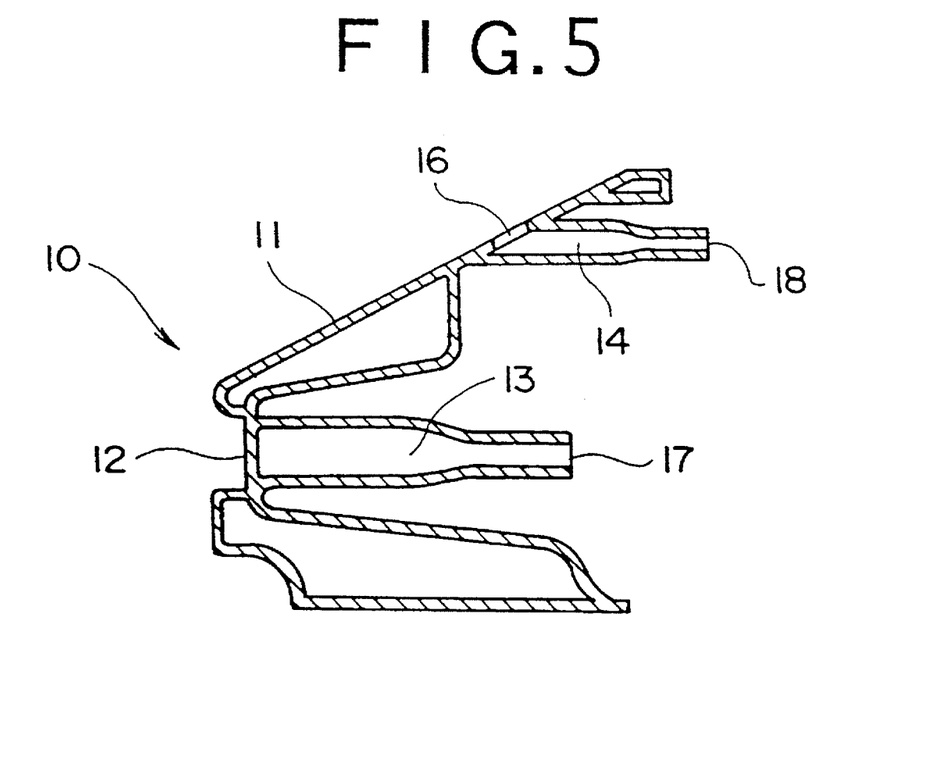
FIG. 5 is a sectional view of the point C in FIGS. 1, 2 of the above embodiment.
Figure 6:
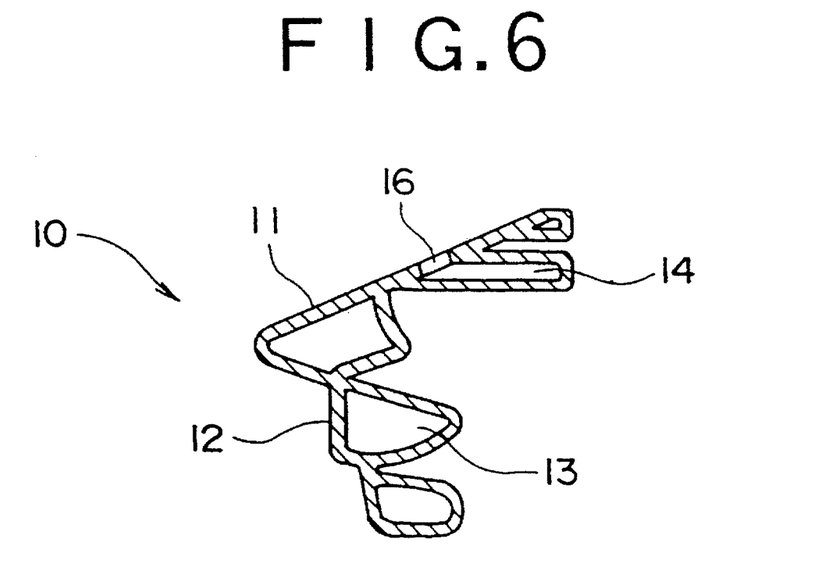
FIG. 6 is a sectional view of the point D in FIGS. 1, 2 of the above embodiment.
Figure 7:
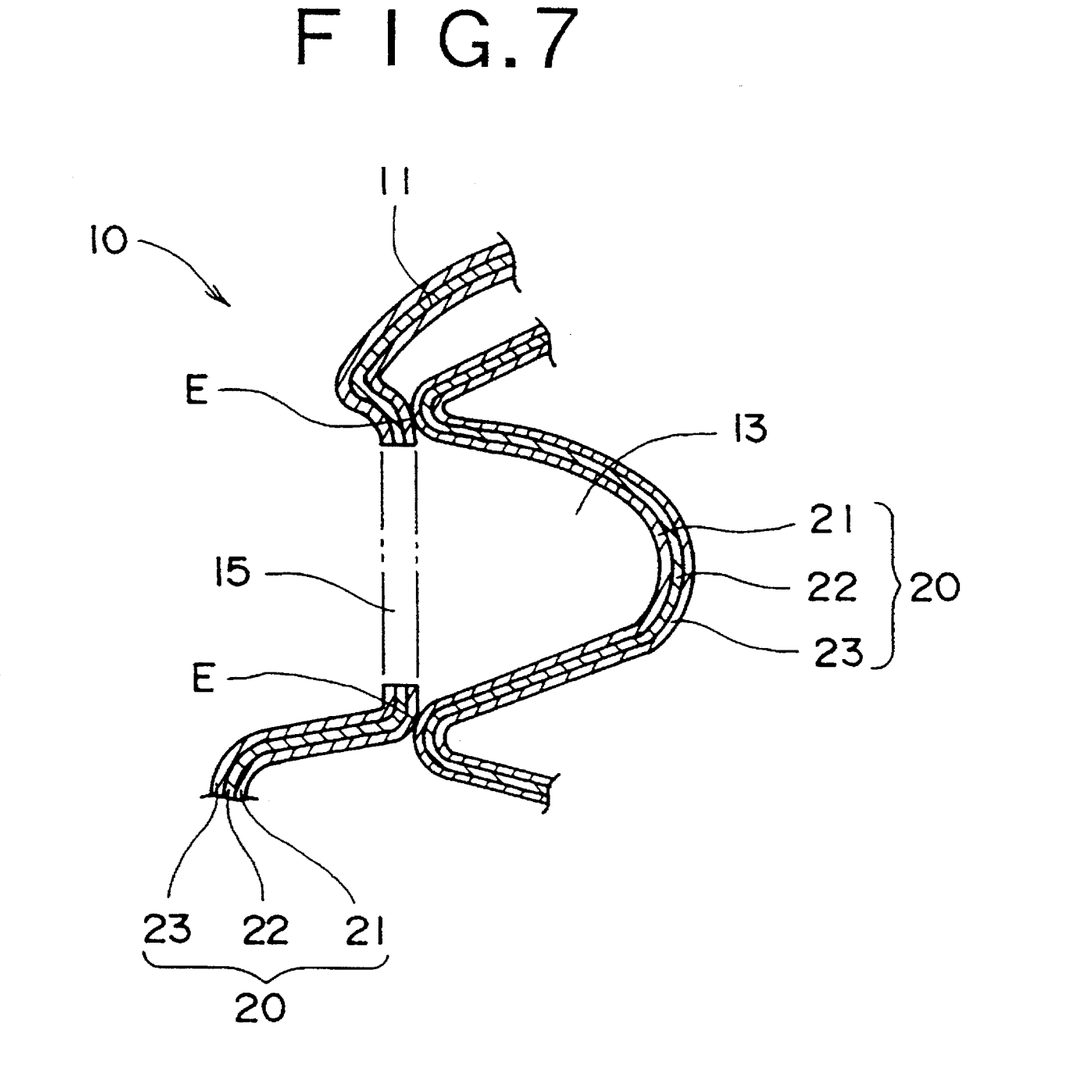
FIG. 7 is an enlarged view of a part of FIG. 3 of the above embodiment.

From FIG. 1 to FIG. 7 depict an instrument panel 10 as the interior member relating with this embodiment. FIG. 1 depicts a front view (view of looking from the driver's seat) of the instrument panel 10, FIG. 2 depicts a back view, FIG. 3, 4, 5, 6 depict sectional views at points of A, B, C, D in FIG. 1, 2, and FIG. 7 depicts enlarged view of a part of FIG. 3.

In those drawings, the instrument panel 10 provides a hollow main body 11 which is formed with a curved plate member 20 (see FIG. 7), a meter cluster section 12 which is formed as a part of the main body 11 is indented on the inside for laying every meter, a duct 13 for car interior temperature control formed on the inside of the main body 11 and a duct 14 for defroster to defrosting.

The ducts 13, 14 hold blast nozzle 15, 16 which are placed in front of the instrument panel 10 (on the side of the driver's seat) to vent air for the defroster or for the car interior temperature control to inside of the car or a wind shield, and supply ducts 17, 18 placed on back side to supply above gas into the ducts 13, 14.

The main body 11 apples to the core member and part of the functional member, and the meter cluster 12 and the ducts 13, 14 apply to the functional member.

In FIG. 7, a plate member 20 forming every part of the instrument panel 10 holds a three layer structure which are a base layer 21 in the most inside, a foamed layer 22 placed outside of the base layer 21 and a surface layer 23 of the most outside (side of surface), and the three layers are simultaneously formed by a multilayer blow molding.

The base layer 21 is made from polyolefin resin material or better made from polypropylene resin material, and might be composed of the polypropylene resin material and inorganic filler (talc, mica, calcium carbonate and others), glass fiber or rubber (much more olefin rubber) to improvement of high-impact properties.

The base layer 21 keeps a shape of the instrument panel 10 and bestows mechanical properties of stiffness properties or high-impact properties.

A thickness of the base layer 21 is 1–15 mm or much better 2–10 mm.

Desirable instances of concrete organization of component of the base layer 21 are enumerated (A) propylene-ethylene block copolymer 66–99 weight % in melt index less 1.0 g/10 min. and in isotacticpentad index of propylene homopolymer more 90 mole %, (B) high-density polyethylene 5–30 weight % in melt index less 0.1 g/10 min., (C) rubber-like polymer 10–30 weight, %, (D) inorganic filler 5–30 weight %, that has average particle diameter less 10 μm in a powder or a fiber state. By using the blow molding resin material including above (A), (B), (C), (D), the large blow molding can be facilitated, and satisfying molding products in external appearance and mechanical properties can be obtained.

The surface layer 23 is made from the polyolefin resin material which is capable of using polyolefin resin such as polyethylene, polypropylene and polybutene-1 or a polyolefin type rubber such as ethylene-propylene copolymer rubber and ethylene-propylene-diene copolymer rubber as material, and composition or cross linking of the above materials or mixture of various filler and the above materials might be possible. The surface layer 23 bestows the design, the sense of quality, the sense of touch and the sense of luxury.

A thickness of the surface layer 23 is 0.5–10 mm, or 1–5 mm in more preferred versions of the invention.

The foamed layer 22 is made from foamed the polyolefin resin material which is capable of using polyolefin resin such as polyethylene, polypropylene and polybutene-1, polyolefin rubber such as ethylene-propylene copolymer rubber and ethylene-propylene-diene copolymer rubber, or the composition or the cross linking of the above material. Thermoplastic olefin elastomer (TPO) satisfies and more than satisfaction is thermoplastic olefin elastomer (TPO) blended polyolefin type rubber such as ethylene-propylene copolymer rubber and ethylene-propylene-diene copolymer rubber.

The foamed layer 22 bestows the sound insulation, the deluxe sound on tapping and the damping on the instrument panel 10.

A thickness of the foamed layer 22 is 1–5 mm, and in more preferred versions of the invention likely 2–10 mm.

Satisfying instance of concrete component of the foamed layer 22 is enumerated thermoplastic olefin elastomer with ethylene content 5–30 weight % within the range of isotactic index 50–90% by a boiling n-heptane extraction and the range of melt index 0.1–5 g per 10 min. In this case, more than the above range of melt index is not preferable because foaming up ratio is insufficient for low viscosity on making the foamed layer, and less than the above range is not preferable because a flow characteristics is dissatisfied on forming. More than the above range of the isotactic index is not adequate because a sense of soft touching is spoiled on completing the product, and less than the above range is not adequate because the foaming up ratio is insufficient for low viscosity.

The foamed layer 22 can be reasonably used olefin copolymer rubber within the range of a mooney viscosity ($ML_{1+4}100°$ C.) 40–90 with propylene content amount 45–70 weight %. Out above range of propylene content amount is not adequate because stiffness of rubber raises and then the sense of soft touching is spoiled on completing the product. Less than the above range of the mooney viscosity is not adequate for spoiling the sense of soft touching because stiffness properties and stiffness are increased by orientation which shear on forming easily forms orientation layer, and more than the above range is not adequate because the foaming up ratio is insufficient on making the foamed layer.

The foamed layer 22 can be suitably used for blending above thermoplastic olefin elastomer and olefin copolymer rubber.

A method of foaming in the foamed layer 22 is adopted to can make foam on forming to blend foaming agent in the range of decomposition temperature 150°–250° C. and resin composition 0.5–6 per weight. For example, 4 per weight of Polyethylene EE-207 (name of product), made by EIWA KASEI KOHGYOH, Inc., in decomposition temperature 210° C. is blended as the foaming agent to make foam.

In this embodiment, after performing a tubular parison from the base layer 21, the foamed layer 22 and the surface layer 23 by extrusion or injection, and the instrument panel 10 is formed from the parison which is inflated to blow air into the inner parison while clamping the parison in a die fitted a form of the product and then which is cool down and allowed to solidify.

Because a part of the parison is secured with opposite another parison (E section in FIG. 7) when the parison is clamped in the die in the blow molding, the ducts 13, 14 are formed out of inner space of the instrument panel 10.

The blast nozzle 15, 16 and the supply duct 17, 18 of the duct 13, 14 are formed to cut a part of the plate member which after cool down and solidify.

The instrument panel 10 can be molded by usual blow molding method, and a instance of molding condition is enumerated to can be molded in screw 90 mm$\phi$, die 300 mm$\phi$, temperature resin 200°–240° C. and mold temperature 28° C. for using a blow molding machine 90 mm$\phi$ made by ISHIKAWAJIMA HARIMA KOHGYOH, Inc..

Following effectiveness is in the embodiment.

The main body 11 of the instrument panel 10, the meter cluster 12 and duct 13, 14 are integrally molded with the blow molding, and the base layer 21, the foamed layer 22 and the surface layer 23 are simultaneously molded with the multilayer blow molding, therefore on the current, the number of parts can be retrenched to all integrally mold the core member 91 arranged the current instrument panel 90 in FIG. 8 and the functional member which is assigned as the duct 92, the meter cluster 93 and the surface member 94.

And materials, dies, molding apparatus and others to use for molding can be retrenched, and management of members can be easy.

A process of molding can be retrenched on the occasion of manufacturing the instrument panel 10 with fewer number of parts, and also a process of assembly can be unnecessary.

The plate member 20 forming the instrument panel 10 includes the foamed layer 22 can provide the sound insulation, the noble sound on tapping and the damping on the instrument panel 10. Concurrently the foamed layer 22 is simultaneously molded with the base layer 21 and the surface layer 23 by the multilayer blow molding, so that increase of number of parts with the foamed layer 22 can be prevented.

All of the base layer 21, the foamed layer 22 and the surface layer 23 are molded with the polyolefin resin material, therefore collective recycling and a work recycling can be easier.

The duct 13, 14 forming for using inner space of the instrument panel 10 can make number of part of the instrument panel 10 retrench and can make inside structure of the instrument panel 10 simplify.

The present invention is not restricted within the above embodiment, but also other component to can realize the object of the present invention is included, that is following transformation is included in the present invention.

In the present invention, the plate member 20 forming the instrument panel 10 includes the foamed layer 22, but the structure with the base layer 21 and the surface layer 23 exclude the foamed layer 22 might be possible. It is preferable, however, to provided the foamed layer 22 to can be bestowed the sound insulation, the noble sound on tapping and the damping on the instrument panel 10.

The three layers of the base layer 21, the foamed layer 22 and the surface layer 23 are simultaneously formed with multilayer blow molding in the above embodiment, but the base layer 21 is molded with the single layer blow molding and then the foamed layer 22 and the surface layer 23 might be adhered to such base layer 21, or the base layer 21 and the foamed layer 22 which are first simultaneously molded with the multilayer blow molding might be adhered to the surface layer 23, in short, the base layer 21 has to be molded with the blow molding. All of the three layers, however, are simultaneously molded with the multilayer blow molding to can scheme fewer number of parts.

The main body 11 of the instrument panel 10, the meter cluster 12 and the duct 13, 14 are integrally molded with the blow molding in the above embodiment, but it is unnecessary to integrally mold all functional member, that is, the duct 13, 14 and the main body 11 are integrally molded and the meter cluster 12 might be another member as in the past. As many as possible of, desiring all of the functional member and the main body are integrally molded to can more scheme fewer number of parts.

All three layer of the base layer 21, the foamed layer 22 and the surface layer 23 are molded with the polyolefin resin material, but all layers are unnecessary to mold with the polyolefin resin material. All layers which are molded with the polyolefin resin material, however, are desired because recycling can be collectively effected and the work recycling can be easy.

The material of the base layer 21, the foamed layer 22 and the surface layer 23 is not restricted to the polyolefin resin material but is volunteered in case of the thermoplastic resin material for using the blow molding.

The structure that the instrument panel 10 holds the meter cluster 12, the duct 13, 14 and other is not necessarily always, for example, the instrument panel 10 might hold other functional member such as a gloved box unit and other.

The car interior member is assigned as the instrument panel 10 in the above embodiment, and in the present invention other interior member in the car such as the rear-board unit, the door trim, the console unit, the head rest, the trunk-room unit and every lid can be accepted the application.

Following comparative experiments were effected for ascertaining effect on the present invention.

Experiment 1-6 that were prepared as an instrument panel holding integral structure by the blow molding in the embodiment of the present invention and comparison 1-3 that were prepared as an instrument panel holding usual divided structure against the experiment 1-6 were compared about every performance and function.

In the experiment 1, 2, only the base layer 21 was molded with the single layer blow molding and was adhered to the surface layer 23. The foamed layer 22 was not provided.

In the experiment 1, the base layer 21 was assigned as mixture that was propylene-ethylene block copolymer 70 weight % (melt index 0.57 g/10 min., ethylene content 1.9 weight %, isotacticpentad index 92 mole %), high-density polyethylene 10 weight % (melt index 0.03 g/10 min.), ethylene-propylene copolymer rubber 10 weight % (mooney viscosity [$ML_{1+4}$ 100° C.]=70, propylene content 27 weight %), and talc 10 weight % (an average diameter of grain 1.5 micron). The surface was assigned as thermoplastic olefin elastomer with ethylene content 25 weight % in range within isotactic index 60 weight % for the boiling n-heptane extraction method and melt index 0.5 g per 10 min.

In the experiment 2, the base layer 21 was used glass fiber of diameter 13 μm instead of talc in the base layer 21 of the experiment 1. And, the surface layer 23 was assigned as the same of the experiment 1.

In the experiment 3-6, the three layer of the base layer 21, the foamed layer 22 and the surface layer 23 were molded with the multilayer blow molding.

In the experiment 3, the base layer 21 was used of high density polyethylene in density 0.950 g/cm$^2$ and melt index 0.03 g per 10 min. And the surface layer 23 was assigned as the same of the experiment 1. The foamed layer 22 was assigned as a composition that was thermoplastic olefin elastomer 50 weight % (ethylene content 25 weight %, isotactic index 60% by the boiling n-heptane extraction method, melt index 0.5 g/10 min.), and ethylene-propylene copolymer rubber 50 weight % (propylene content 65 weight %, mooney viscosity [$ML_{1+4}$ 100° C.]=76).

In the experiment 4, the base layer 21 was assigned as propylene-ethylene block copolymer (ethylene content 1.9 weight %, melt index 0.57 g/10 min., isotacticpentad index 92 mole %). The surface layer 23 and the foamed layer 22 were assigned as the same of the experiment 3.

In the experiment 5, the base layer 21 was assigned as the same of the experiment 1. The surface layer 23 and the foamed layer 22 were assigned as the same of the experiment 3.

In the experiment 6, the base layer 21 was assigned as the same of the experiment 2. The surface layer 23 and the foamed layer 22 were assigned as the same of the experiment 3.

In the comparison 1, all of the core member 91 in FIG. 3 and other functional member were made by injection molding with PPF, and the surface member 94 (the foamed layer and the surface layer) was not provided.

In the comparison 2, 3, after the core member 91 and other functional member were molded with transformed thing (the name of product, NORIRU) of PPO (polyphenylene oxide), PPF (filler filled polypropylene), and PPG (filled polypropylene glassfiber), the surface member 94 (the foamed layer and the surface layer) was provided. The surface layer was made from PVC (polyvinyl chloride) and the foamed layer was made from urethane foam. The surface member 94 was placed on the part of the surface instrument panel in the comparison 2, and in the comparison 3 the surface member 94 was placed on whole surface instrument panel.

Following are ways of evaluation of every performance and function for the experiment 1-6 and the comparison 1-3.

About the sense of touch, ○ meant case of having feeling of pliant (feeling of soft) on touching by hand and having the sense of expansiveness in bass on tapping, × meant case of having cheaply feel for a high tone on tapping and Δ meant case of feeling middle of ○ and ×.

About sound insulation, under condition of sound 103 dB in the engine room, loudness was measured in the inside in the car when every instrument panel was simply provided.

About damping, × meant case of generating strange oscillatory sound or clear damage of the product, ○ meant in level of standing for nothing unusualness when oscillation in cycle 30 Hz was gained 10$^7$ times with situated an excitation machine in state of usually providing every instrument panel.

About high-temperature properties, every instrument panel was left alone for a half hour in room temperature after keeping for four hours under fixed atmosphere temperature, and then injurious transformation, stickiness on the surface and yes or no of unusualness such as a damage and a fault hindering to usual operating were ascertained. The highest temperature by appearing unusualness was measured to let temperature change for such action.

TABLE 1

| | surface layer | foamed layer | base layer | feeling | sound insulation | damping | high-temperature properties | number of parts | recycling possibility | summary |
|---|---|---|---|---|---|---|---|---|---|---|
| Experiment 1 | TPO | — | PPF | Δ | Δ 71.5dB | ○ | 125° C. | 2 | possible | Δ |
| Experiment 2 | TPO | — | PPG | Δ | Δ 71.5dB | ○ | 140° C. | 2 | possible | Δ |
| Experiment 3 *1 | TPO | TPO Forming | HDPE | ○ | Δ~○ 69.5dB | ○ | 115° C. | 1 | possible | Δ |
| Experiment 4 | TPO | TPO Forming | PP | ○ | Δ~○ 69.5dB | ○ | 120° C. | 1 | possible | ○ |
| Experiment 5 | TPO | TPO Forming | PPF | ○ | Δ~○ 69.5dB | ○ | 125° C. | 1 | possible | ○ |
| Experiment 6 *2 | TPO | TPO Forming | PPG | ○ | Δ~○ 69.5dB | ○ | 140° C. | 1 | possible | ○ |
| Comparison 1 | — | — | PPF | X | X 74.5dB | X | 115° C. | 3 | possible | X~Δ |
| Comparison 2 | (partial) PVC | (partial) urethane forming | NORIRU PPG PPF | ○ | X 74.5dB | X | 115° C. | 4 | impossible | Δ |
| Comparison 3 | (entire) PVC | (entire) urethane forming | NORIRU PPG PPF | ○ | Δ 71.5dB | X | 115° C. | 4 | impossible | Δ |

NOTE;
*1 → Integrated structure by blow molding
*2 → Conventional structure

Table 1 is shown results of the comparative experiments.

The experiment 3-6 result in possible recycling as number of parts is one because of the multilayer blow molding of the three layer and in excellent performance of others.

In the experiment 1, 2, the surface layer 23 is adhered later so that number of parts is two in more than the experiment 3-6 but less than as in the past, and recycling is made possible.

In opposition, the comparison 1 is made possible to recycle for one sort of material, but is held a lot of number of parts and fault performance of others.

The comparison 2, 3 bestow the sense of luxury to provide the surface 94 (foamed layer and surface layer), but hold a lot of number of parts and can not recycle to a lot of kind of materials.

Effectiveness of the present invention was conspicuously shown from above comparative experiments.

As the foregoing description of the present invention, it is effect of being able to reduce number of parts and to develop recycling because the core member and every functional member arranged the car interior member are integrally molded with the blow molding.

What is claimed is:

1. An interior molding for a vehicle having a vehicle passenger compartment, said molding comprising:

an outer member, said outer member including a base layer formed from rigid plastic material, said base layer having an outer surface directed toward the vehicle passenger compartment and an inner surface directed away from the vehicle passenger compartment, a foam layer disposed over said base layer outer surface and a surface layer disposed over said foam layer so that said surface layer forms an outer skin for said outer member; and an inner member including a base layer formed from rigid plastic material and having an outer surface directed away from the vehicle passenger compartment and an opposed inner surface directed toward said outer member base layer, said inner member base layer being attached to said outer member base layer along two spaced-apart lines so as to define a duct extending under said interior molding outer member.

2. The interior molding assembly of claim 1, wherein said base layer, said foam layer and said surface layer of said outer member are formed to define an opening in said outer member that extends into said duct.

3. The interior molding assembly of claim 2, wherein said inner member base layer is shaped to define a stem section that defines an inner member inlet passage integral with said duct and said stem section is formed with an opening into said inlet passageway, wherein said outer member opening and said inner member inlet passageway are axially offset from each other.

4. The interior molding assembly for a vehicle of claim 3, wherein said outer member is shaped to define a recess along said outer skin thereof adapted to receive an external component.

5. The interior molding assembly of claim 1, further including a foam layer at least partially disposed over said inner member base layer outer surface.

6. The interior molding assembly of claim 5, wherein said outer member foam layer and said inner member foam layer are formed from a polyolefin resin.

7. The interior molding assembly of claim 5, further including a surface layer disposed over said inner member foam layer, said surface layer forming an outer skin for said inner member.

8. The interior molding assembly of claim 7, wherein said outer member surface layer and said inner member surface layer are formed from a polyolefin resin.

9. The interior molding assembly of claim 1, wherein said inner member further includes a foam layer disposed over said inner member base layer outer surface and a surface layer disposed over said foam layer, said surface layer forming an outer skin for said inner member.

10. The interior molding assembly of claim 9, wherein:

said inner member is formed so as to define a stem section having an inlet passage in communication with said duct that extends away from said outer member and said inner member is further formed with an opening in said stem section into said inlet passage; and said surface layer, said foam layer and said base layer of said outer member are shaped to define an outlet port in said outer member fluid in communication with said duct, said outer member outlet port being axially spaced away from said inner member inlet passage.

11. The interior molding assembly for a vehicle of claim 10, wherein said outer member is shaped to define a recess along said outer skin thereof adapted to receive an external component.

12. A method of forming a vehicle interior molding, said method including the steps of:

assembling an outer member by shaping a first base layer formed of a rigid plastic to have a selected form, applying a foam layer over an outer surface of said base layer and applying a surface layer over said foam layer so that upon curing said surface layer forms an outer skin for said outer member;

assembling an inner member by shaping a second base layer formed of rigid plastic to have a selected shape wherein at least a portion of said second base layer is formed to have a non-planar profile; and securing said second base layer to an inner surface to an inner surface of said first base layer along two spaced apart lines so that said portion of said second base layer having a non-planar profile and an adjacent section of first base layer define a duct that extends underneath said outer member.

13. The method of assembling an interior vehicle molding of claim 12, further including the step of selectively forming said outer member so as to define an outlet port for in said outer member for said duct.

14. The method of assembling an interior molding of claim 13, wherein said outlet port is formed by removing selected overlapping sections of said first base layer, said foam layer and said surface layer from said outer member.

15. The method of assembling an interior molding of claim 13, further including the steps of shaping said interior member so as to form a hollow stem section in fluid communication with said duct and selectively removing a portion of said base layer so as to form an inlet port for said stem section, wherein said second base layer is shaped so that said stem section is axially offset from said outer member outlet port.

16. The method of assembling an interior molding of claim 12, further including the steps of shaping said second base layer so as to form a hollow stem section in said inner member that is in fluid communication with said duct and selectively forming said base layer so as to form an inlet port for said stem section.

17. The method of assembling an interior molding of claim 12, further including the steps of further forming said interior member by placing a foam layer over an outer surface of said second base layer, said second base layer outer surface being the surface of said base layer opposite said surface to said first base layer and applying a surface layer over said inner member foam layer so that said surface layer forms an outer skin around said inner member.

18. The method of assembling an interior vehicle molding of claim 17, further including the steps of:

selectively forming said outer member so as to define an outlet port for said outer member for said duct; and shaping said interior member so as to form a hollow stem section fluid communication with said duct and selectively removing a portion of said base layer so as to form an inlet port for said stem section, wherein said second base layer forming said interior member is shaped so that said stem section is axially offset from said outer member outlet port.

19. The method of assembling an interior molding of claim 18, wherein said outlet port is formed by removing selected overlapping sections of said first base layer, said foam layer and said surface layer from said outer member.

20. The method of assembling a interior molding of claim 18, wherein said inlet port is formed in said inner member by selectively removing a section of said second base layer forming said inlet member.

* * * * *

UNITED STATES PATENT AND TRADEMARK OFFICE
CERTIFICATE OF CORRECTION

PATENT NO. : 5,527,581
DATED : June 18, 1996
INVENTOR(S) : Minoru SUGAWARA et al It is certified that error appears in the above-indentified patent and that said Letters Patent is hereby corrected as shown below:

Column 10, line 49; change "passageway" to ---passage---.
           line 50; change "passageway" to ---passage---.
Column 11, line 34; delete "an inner surface to".
           line 42; delete "for".
Column 12, line  4; change "interior" to ---inner---.
           line 19; change "interior" to ---inner---.
           line 29; change "interior" to ---inner---.
           line 33; change "interior" to ---inner---.
           line 40; change "a" to ---an---.

Signed and Sealed this

Twenty-first Day of January, 1997

Attest:

BRUCE LEHMAN

*Attesting Officer*     *Commissioner of Patents and Trademarks*